US009645400B2

(12) United States Patent
Kwon et al.

(10) Patent No.: US 9,645,400 B2
(45) Date of Patent: May 9, 2017

(54) THREE-DIMENSIONAL IMAGE DISPLAY DEVICE

(71) Applicant: NDIS Corp., Asan-si, Chungcheongnam-do (KR)

(72) Inventors: Soon Bum Kwon, Asan-si (KR); Sang Hyun Park, Asan-si (KR); Zhe Hong, Asan-si (KR)

(73) Assignee: NDIS Corp. (KR)

( * ) Notice: Subject to any disclaimer, the term of this patent is extended or adjusted under 35 U.S.C. 154(b) by 42 days.

(21) Appl. No.: 14/862,996

(22) Filed: Sep. 23, 2015

(65) Prior Publication Data

US 2016/0062129 A1 Mar. 3, 2016

Related U.S. Application Data

(63) Continuation of application No. PCT/KR2013/008253, filed on Sep. 12, 2014.

(30) Foreign Application Priority Data

Mar. 25, 2013 (KR) .................. 10-2013-0031719

(51) Int. Cl.
*G02F 1/1335* (2006.01)
*G02B 27/22* (2006.01)
(Continued)

(52) U.S. Cl.
CPC ..... *G02B 27/2214* (2013.01); *G02F 1/13394* (2013.01); *G02F 1/29* (2013.01);
(Continued)

(58) Field of Classification Search
CPC ........... G02B 27/2214; H04N 13/0409; H04N 13/0415; G02F 1/13394; G02F 1/13471; G02F 1/29
(Continued)

(56) References Cited

U.S. PATENT DOCUMENTS

2013/0038922 A1 2/2013 Kirita
2013/0162610 A1* 6/2013 Cho .................. G09G 5/10
345/205

FOREIGN PATENT DOCUMENTS

JP 2004-118140 4/2004
JP 2013037219 2/2013
(Continued)

OTHER PUBLICATIONS

International Search Report and Written Opinion issued in corresponding application PCT/KR2013/008253, dated Dec. 12, 2013, pp. 1-13.
(Continued)

*Primary Examiner* — Charles Chang
(74) *Attorney, Agent, or Firm* — Brinks Gilson & Lione (57) ABSTRACT

The present invention provides a three-dimensional image display device for improving the visibility with prevention of moiré phenomena. The display device includes an image panel having a pixel repeatedly arranged in a first direction. The pixel consists of k sub-pixels where k is natural number. The average of the center distances between adjacent sub-pixels in the first direction is $P_{sub}$. The display also includes a barrier panel arranged before or behind the image panel, a first substrate and a second substrate facing each other. The barrier panel is arranged between the first and the second substrate. The display device further includes a plurality of walls extended in a second direction crossing the first direction arranged with an interval $P_w$ in the first direction, where m is a natural number but not a multiple of k, and $P_w = mP_{sub}$.

20 Claims, 7 Drawing Sheets

(51) Int. Cl.
  *H04N 13/04*   (2006.01)
  *G02F 1/1339*  (2006.01)
  *G02F 1/29*    (2006.01)
  *G02F 1/1347*  (2006.01)
(52) U.S. Cl.
  CPC ..... *H04N 13/0409* (2013.01); *H04N 13/0415* (2013.01); *G02F 1/13471* (2013.01)
(58) Field of Classification Search
  USPC .......................................................... 349/15
  See application file for complete search history.

(56) References Cited

FOREIGN PATENT DOCUMENTS

| KR | 1020080060950 | 7/2008 |
|----|---------------|--------|
| KR | 1020090041575 | 4/2009 |

OTHER PUBLICATIONS

Office Action issued in application corresponding application KR10-2013-0031719, issued May 24, 2013, pp. 1-4.
Notice of Allowance issued in corresponding application KR10-2013-0031719, issued Aug. 29, 2015, pp. 1-3.

\* cited by examiner

THREE-DIMENSIONAL IMAGE DISPLAY DEVICE

PRIORITY CLAIM

This application is a continuation application of Patent Cooperation Treaty (PCT) international application Serial No. PCT/KR2013/008253, filed on Sep. 12, 2014, and which designates the United States, which claims the benefit of the filing date of Korean Patent Application Serial No. 10-2013-0031719, filed on Mar. 25, 2013. The entirety of both PCT international application Serial No. PCT/KR2013/008253 and Korean Patent Application Serial No. 10-2013-0031719 are incorporated herein by reference.

TECHNICAL FIELD

The present invention is related to a three-dimensional image display device, and more particularly, to a three-dimensional image display device with improved visibility by preventing moiré phenomena.

BACKGROUND ART

In general, a three-dimensional image is formed on the basis of stereoscopy as perceived through the two eyes of a person. The most important factor of the three-dimensional effect is the binocular disparity caused by the distance of about 65 mm between the two eyes. That is, by allowing a left eye image to be recognized only via the left eye and a right eye image to be recognized only via the right eye, an observer may experience binocular disparity due to a difference between the left eye image and the right eye image, and thus recognize a three-dimensional image.

SUMMARY

A three-dimensional image display device in the related art may have low visibility due to moiré phenomena occurring in an image panel and a barrier panel that allow a left eye image to be recognized via a left eye only and a right eye image to be recognized via a right eye only.

In order to solve one or more problems including the above, the present invention provides a three-dimensional image display device with improved visibility by preventing moiré phenomena. However, this purpose is only an example, and the scope of the present invention is not limited thereto.

According to an aspect of the present invention, a three-dimensional image display apparatus includes an image panel comprising pixels repeatedly arranged, each of the pixels comprising k sub-pixels in a first direction, wherein k is a natural number and $P_{sub}$ is an average of center distances between adjacent sub-pixels in the first direction, and a barrier panel arranged in a forward direction or a backward direction from the image panel. The barrier panel includes a first substrate and a second substrate facing each other, a first electrode layer between the first substrate and the liquid crystal layer, and a second electrode layer between the second substrate and the liquid crystal layer, and a plurality of walls between the first substrate and the second substrate, extending in a second direction that crosses the first direction, and arranged with an interval $P_w$ therebetween in the first direction. At least one of the first electrode layer and the second electrode layer comprises a plurality of stripe electrodes, and the barrier panel is configured to have a transmitting area and a non-transmitting area according to electric signals applied to the first and second electrode layers, and when m is a natural number that is not a multiple of k, $P_w = mP_{sub}$.

Each of the plurality of walls may extend in the second direction and a position thereof may change in the first direction.

In this case, a width W of each of the plurality of walls may be equal to or greater than $P_w$.

A width W of each of the plurality of walls of which position changes in the first direction may be equal to or greater than $kP_{sub}$.

In each of the plurality of walls, an identical pattern may be repeated in the second direction for every distance d, and the distance d may be equal to or less than $2kP_{sub}$.

According to another aspect of the present invention, a three-dimensional image display apparatus includes an image panel comprising pixels repeatedly arranged, each of the pixels comprising k sub-pixels in a first direction, wherein k is a natural number and $P_{sub}$ is an average of center distances between adjacent sub-pixels in the first direction, and a barrier panel arranged in a forward direction from the image panel. The barrier panel includes a first substrate and a second substrate facing each other, and a plurality of walls between the first substrate and the second substrate, extending in a second direction that crosses the first direction, and arranged at an interval $P_w$ therebetween in the first direction. When $t_1$ is a distance from a color filter layer or an emission layer of the image panel to a center of the barrier panel, $t_2$ is a distance from the center of the barrier panel to an outer surface of the barrier panel in the forward direction, L is a distance from the outer surface of the barrier panel to an optimal observing location in the forward direction from the barrier panel, n is an average refraction index of the three-dimensional image display device, and m is a natural number that is not a multiple of k, $P_w = mP_{sub}(t_2+nL)/(t_1+t_2+nL)$.

Each of the plurality of walls may extend in the second direction and a position thereof may change in the first direction.

A width W of each of the plurality of walls of which position changes in the first direction may be equal to or greater than $kP_{sub}(t_2+nL)/(t_1+t_2+nL)$.

In each of the plurality of walls, nn identical pattern may be repeated in the second direction for every distance d, and the distance d may be equal to or less than $2kP_{sub}(t_2+nL)/(t_1+t_2+nL)$.

According to another aspect of the present invention, a three-dimensional image display apparatus includes an image panel comprising pixels repeatedly arranged, each of the pixels comprising k sub-pixels in a first direction, wherein k is a natural number and $P_{sub}$ is an average of center distances between adjacent sub-pixels in the first direction, and a barrier panel arranged in a backward direction from the image panel. The barrier panel includes a first substrate and a second substrate facing each other, and a plurality of walls between the first substrate and the second substrate, extending in a second direction that crosses the first direction, and arranged with an interval $P_w$ therebetween in the first direction. When $t_1$ is a distance from a color filter layer of the image panel to a center of the barrier panel, $t_3$ is a distance from the color filter layer of the image panel to an outer surface of the image panel in a forward direction, L is a distance from the outer surface of the image panel to an optimal observing location in the forward direction from the image panel, n is an average refraction index of the three-dimensional image display device, and m is a natural number that is not a multiple of k, $P_w = mP_{sub}(t_1+t_3+nL)/(t_3+nL)$.

Each of the plurality of walls may extend in the second direction and a position thereof may change in the first direction.

A width W of each of the plurality of walls of which position changes in the first direction may be equal to or greater than $kP_{sub}(t_1+t_3+nL)/(t_3+nL)$.

In each of the plurality of walls, an identical pattern may be repeated in the second direction for every distance d, and the distance d may be equal to or less than $2kP_{sub}(t_1+t_3+nL)/(t_3+nL)$.

The width W of each of the plurality of walls may be equal to or greater than $P_w$.

The average refraction index n of the three-dimensional image display apparatus may be equal to 1.5.

In the three-dimensional image display apparatus above, equation k=3 may be satisfied.

Each of the k sub-pixels may emit light in a different wavelength range, and adjacent sub-pixels in the second direction may emit light in an identical wavelength range.

According to an embodiment of the present invention described above, a three-dimensional image display device has improved visibility by preventing moiré phenomena. However, the scope of the present invention is not limited to this effect.

The drawings described herein are for illustration purposes only and are not intended to limit the scope of the present disclosure in any way.

DETAILED DESCRIPTION

Hereinafter, embodiments of the present invention will be described with reference to the accompanying drawings. The present invention may, however, be embodied in many different forms and should not be construed as being limited to the exemplary embodiments set forth herein. Rather, these embodiments are provided so that this disclosure of the present invention will be thorough and complete, and will fully convey the scope of the invention concept to one of ordinary skill in the art. Sizes of components in the drawings may be exaggerated for convenience of explanation. In other words, since sizes and thicknesses of components in the drawings are arbitrarily illustrated for convenience of explanation, the present invention is not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

It will be understood that when a component, such as a layer, a film, a region, or a plate, is referred to as being "on" another component, the component can be directly on the other component or intervening components may be present thereon.

Figure 1:
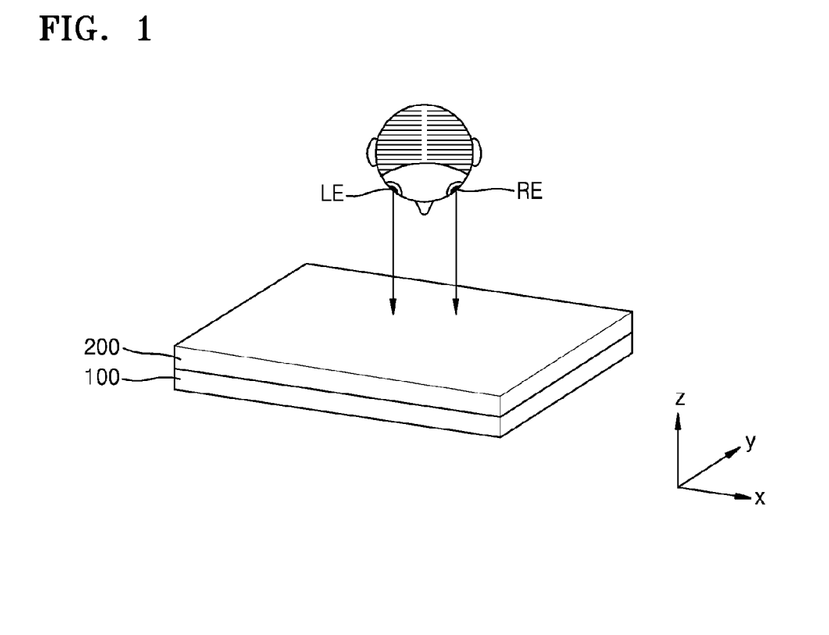
FIG. 1 is a schematic perspective view of an example of using a three-dimensional image display device according to an embodiment of the present invention.
Figure 2:
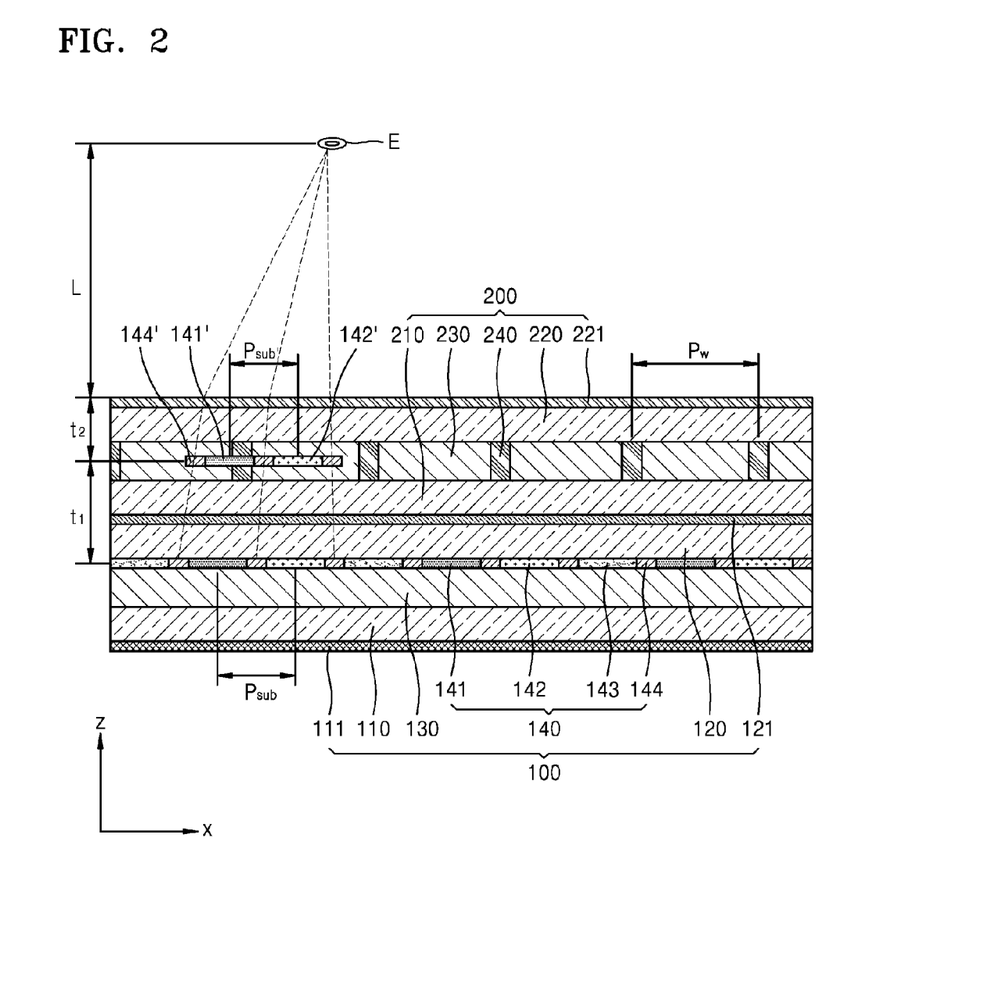
FIG. 2 is a schematic cross-sectional view of the three-dimensional image display device of FIG. 1.

FIG. 1 is a schematic perspective view of an example of using a three-dimensional image display device according to an embodiment of the present invention, and FIG. 2 is a schematic cross-sectional view of the three-dimensional image display device of FIG. 1.

The three-dimensional image display device according to the present embodiment may include an image panel 100 and a barrier panel 200. The image panel 100 is a panel displaying an image that may be seen by an observer, for example, a liquid crystal image panel.

The barrier panel 200 may be located in a forward direction from the image panel 100 and transmit at least some light emitted from the image panel 100. When the three-dimensional image display device displays a three-dimensional image a preset area of the barrier panel 200 may be a non-transmission area through which light may not penetrate so that a left eye image displayed in the image panel 100 is recognized only by a left eye of the observer and a right eye image displayed in the image panel 100 is recognized only by a right eye of the observer. The barrier panel 200 may be referred to as, for example, a parallax barrier panel.

Unlike shown in the drawing, the barrier panel 200 may be located in a backward direction from the image panel 100 and allow light that penetrated through the barrier panel 200 to pass through the image panel 100 and reach the observer. In this case, the image panel 100 may be prepared as a light receiving type display panel instead of a self-emissive display panel, so that the observer may recognize a three-dimensional image. For example, when the image panel 100 is a liquid crystal display (LCD) panel, the barrier panel 200 may be provided between the image panel 100 and a back light. Hereinafter, an example in which the barrier panel 200 is located in the forward direction from the image panel 100 will be described first.

As shown in FIG. 1, the observer may observe the barrier panel 200 in a −z direction, and accordingly, light that is emitted from the image panel 100 and penetrated through the barrier panel 200 is incident on a left eye LE and a right eye RE of the observer.

The image panel 100 is an image panel that may display a color image, for example, an LCD panel as shown in FIG. 2. The image panel 100 may include a bottom substrate 110 and a top substrate 120 that face each other, a liquid crystal layer 130 between the bottom substrate 110 and the top substrate 120, and a color filter layer 140 for forming a color image. When the image panel 100 is an LCD panel, if necessary, a back light may be required in the backward direction from the image panel 100. The top substrate 120 may include a light transmitting material, for example, a glass material or a light transmitting resin. The bottom substrate 110 may also include a light transmitting material when a back light unit is located in the backward direction. Alternatively, when the bottom substrate 110 is a reflective LCD panel in which a back light unit is not provided, the bottom substrate 110 may include a non-transmitting material.

Although not illustrated, a sub-pixel electrode and a thin film transistor that is electrically connected to the sub-pixel electrode may be located between the bottom substrate 110 and the liquid crystal layer 130 of the image panel 100. Also, a common electrode may be located between the top substrate 120 and the liquid crystal layer 130. An alignment layer may be located at a necessary place. A polarization plate 111 may be located outside the bottom substrate 110 of the image panel 100, and a polarization plate 121 may be located outside the top substrate 120. For example, a transmission axis of the polarization plate 111 and a transmission axis of the polarization plate 121 may (vertically) cross each other. A sub-pixel electrode or a common electrode may include a conductive material, but if necessary, may include a light transmitting material such as IZO or ITO.

The color filter layer 140 may be located between the liquid crystal layer 130 and the top substrate 120 as shown in FIG. 2. However, the present invention is not limited thereto. The color filter layer 140 may be located on a path of light being emitted to an outer region of the image panel 100.

The color filter layer 140 may have a structure including repeatedly arranged sets of a red color filter 141, a green color filter 142, and a blue color filter 143 in a first direction (+x direction). In this case, each pixel of the image panel 100 includes three sub-pixels, i.e., a red sub-pixel, a green sub-pixel, and a blue sub-pixel. When each pixel of the image panel 100 includes sub-pixels of a number other than three, the structure of the color filter layer 140 changes in correspondence to the number of sub-pixels. Hereinafter, for convenience, an example in which each pixel of the image panel 100 includes three sub-pixels, i.e., a red sub-pixel, a green sub-pixel, and a blue sub-pixel will be described.

In addition to the red color filter 141, the green color filter 142, and the blue color filter 143, the color filter layer 140 may include a black matrix 144 that is provided between the red color filter 141, the green color filter 142, and the blue color filter 143. Although FIG. 2 illustrates that all elements of the color filter layer 140 are located on an identical plane, the present invention is not limited thereto. For example, the black matrix 144 may be provided between the red color filter 141, the green color filter 142, and the blue color filter 143, and a thickness of the black matrix 144 may be greater than respective thicknesses of the red color filter 141, the green color filter 142, and the blue color filter 143. Other various modifications may be possible.

Since a full color image may be formed by the color filter layer 140 when the image panel 100 is an LCD panel, the red color filter 141, the green color filter 142, and the blue color filter 143 of the color filter layer 140 may respectively correspond to the sub-pixels of the image panel 100. That is, an average of a center distance $P_{sub}$ between adjacent sub-pixels in the first direction (+x direction) may be considered as a center distance between those that are adjacent to each other among the red color filter 141, the green color filter 142, and the blue color filter 143 of the color filter layer 140.

The barrier panel 200 includes a first substrate 210 and a second substrate 220 that face each other. The first substrate 210 and the second substrate 220 are light transmitting substrates that include, for example, a glass material or a light transmitting plastic.

As described above, when the barrier panel 200 is located in a forward direction (+z direction) from the image panel 100 toward the observer, for example, the first substrate 210 of the barrier panel 200 may be located toward the image panel 100. Although not illustrated, an attachment layer may be between the barrier panel 200 and the image panel 100 if necessary, or alternatively, an external frame that fixes locations of the barrier panel 200 and the image panel 100 may be provided. However, the barrier panel 200 and the image panel 100 may be spaced apart by a certain distance.

A liquid crystal layer 230 is between the first substrate 210 and the second substrate 220 of the barrier panel 200. Additionally, a plurality of walls 240 may be between the first substrate 210 and the second substrate 220. Although not illustrated, a first electrode layer may be between the first substrate 210 and the liquid crystal layer 230 of the barrier panel 200, and a second electrode layer may be between the second substrate 220 and the liquid crystal layer 230. An alignment layer and other components may be provided in necessary locations. At least one of the first electrode layer and the second electrode layer may be patterned to include a plurality of stripe electrodes. A non-patterned electrode layer may function as a common electrode that corresponds to a plurality of pixels. The first electrode layer or the second electrode layer may include a light transmitting conductive layer, for example, ITO or IZO.

For example, a first electrode layer that extends in a +y direction and includes mutually spaced apart first electrodes with stripe patterns may be located between the first substrate 210 and the liquid crystal layer 230, and a second electrode layer that is a common electrode that covers most of a substrate may be located between the second substrate 220 and the liquid crystal layer 230. In this case, the first electrodes may have a width of, for example, 90 μm and spaced apart by 150 μm. If necessary, the second electrode layer may also include patterned second electrodes.

When a preset electric signal is applied to the first electrodes and the second electrode layer when the three-dimensional image display device displays a three-dimensional image, portions of the barrier panel 200 corresponding to the first electrodes may be a non-transmitting area and function as a parallax barrier, a left eye image displayed in the image panel 100 may be recognized only in the left eye of the observer and a right eye image displayed in the image panel 100 may be recognized only in the right eye of the observer and thus, the observer may observe the three-dimensional image. When an electric signal is not applied to the first electrodes and the second electrode layer, most areas may be transmitting areas, and thus, the observer may observe an ordinary image instead of the three-dimensional image.

An optic film 221 may be located outside the second substrate 220 of the barrier panel 200. The optic film 221 may be a polarization plate or an anti-reflection film.

As illustrated, the plurality of walls 240 of the barrier panel 200 extend in a second direction (+y direction) that crosses the first direction (+x direction). Also, the plurality of walls 240 are arranged with an interval $P_w$ in the first direction (+x direction). The plurality of walls 240 may increase stability by preventing the liquid crystal layer 230 from leaning to one side due to external shock. The plurality of walls 240 may be formed by irradiating light such as ultraviolet rays only onto portions, where the wall 240 is to be formed, on a liquid crystal mixture including a liquid crystal material and photopolymerization monomer. The photopolymerization monomer in the irradiated portions may be photopolymerized, and thus the wall 240 with a polymer structure is formed. In this case, the liquid crystal material become naturally located in spaces between the plurality of walls 240 and forms the liquid crystal layer 230 as illustrated.

The three-dimensional image display device according to the present embodiment allows the observer to observe a three-dimensional image, and effectively prevent image quality decrease due to the image panel 100 and the barrier panel 200.

In general, moiré phenomena occurs, when first objects arranged with a fixed interval $P_1$ overlaps second objects arranged with another fixed interval $P_2$, at a location x that satisfies $x=aP_1=bP_2$, wherein a and b are natural numbers and a and b are not multiples of one another. As the moiré phenomena appear as unintentional patterns on a display, visibility of the observer and quality of displayed images decrease.

In a three-dimensional image display device, the moiré phenomena may occur due to the black matrix 144 arranged with a fixed interval (in the +x direction) in the color filter layer 140 of the image panel 100 and the plurality of walls 240 of the barrier panel 200 arranged with a fixed interval (in the +x direction). However, in the three-dimensional image display device according to the present embodiment, an interval between the plurality of walls 240 of the barrier panel 200 may be appropriately adjusted so that the moiré phenomena do not occur.

When appropriately adjusting the interval between the plurality of walls 240 of the barrier panel 200 to prevent the moiré phenomena, an interval between projected black matrices 144' that are projected into the barrier panel 200 has to be considered instead of the actual interval between the black matrices 144 in the color filter layer 140 of the image panel 100. This is because the moiré phenomena occur when the first objects arranged with the fixed interval $P_1$ are at the same locations as the second objects arranged with the other fixed interval $P_2$ based on the observer. Therefore, it is necessary to check the interval between the projected black matrices 144' that are projected into a central area of the barrier panel 200 in a thickness direction (+z direction).

As shown in FIG. 2, the actual interval between the black matrix 144 of the color filter layer 140 of the image panel 100 in the first direction (+x direction) may be considered as a center distance between those that are adjacent to each other among the red color filter 141, the green color filter 142, and the blue color filter 143 of the color filter layer 140 in the first direction (+x direction), and also, considered as the center distance $P_{sub}$ between the adjacent sub-pixels in the first direction (+x direction). The interval between the projected black matrices 144' projected into the barrier panel 200 which are recognized by the observer may also be considered as a center distance $P_{sub'}$ between adjacent sub-pixels that are projected into the barrier panel 200.

Light that passed through the color filter layer 140 curves while passing through an outer surface of the barrier panel 200 in the observer's direction (+z direction) and is incident on an eye E of the observer. Although a variety of refraction of light may occur because a refraction index of each layer in the image panel 100 or the barrier panel 200 varies, refraction indexes of most materials in the image panel 100 and the barrier panel 200 are around 1.5. Therefore, an average refraction index of the three-dimensional image display device including the image panel 100 and the barrier panel 200 may be considered as 1.5.

When '$t_1$' represents a distance from the color filter layer 140 of the image panel 100 to the center of the barrier panel 200, '$t_2$' represents a distance from the center of the barrier panel 200 to the outer surface of the barrier panel 200 in the observer's direction (+z direction), 'L' represents a distance from the outer surface of the barrier panel 200 in the observer's direction (+z direction) to an optimal observing location, and 'n' represents an average refraction index of the three-dimensional image display device, the center distance $P_{sub'}$ between the adjacent sub-pixels projected into the barrier panel 200 may be shown as Equation 1 according to the Snell's law and geometric structures.

$$P_{sub}'=P_{sub}(t_2+nL)/(t_1+t_2+nL) \qquad \text{[Equation 1]}$$

As described above, the moiré phenomena occurs, when the first objects arranged with the fixed interval $P_1$ overlaps the second objects arranged with the other fixed interval $P_2$, at a location x that satisfies $x=aP_1=bP_2$, wherein a and b are natural numbers and a and b are not multiples of one another. Therefore, in order to prevent the moiré phenomena from occurring between the plurality of walls 240 arranged with an average interval $P_w$ and the projected black matrices 144' arranged with an average interval $P_{sub'}$, $P_w=mP_{sub'}$ or $P_w=P_{sub'}/m$ has to be satisfied, wherein 'm' is a natural number. Therefore, the average interval $P_w$ of the plurality of walls 240 may be shown as Equation 2.

$$P_W=mP_{sub}(t_2+nL)/(t_1+t_2+nL)$$

or $$P_W=P_{sub}(t_2+nL)/m(t_1+t_2+nL) \qquad \text{[Equation 2]}$$

However, when $P_w=P_{sub}(t_2+nL)/m(t_1+t_2+nL)$ is satisfied, white balance may be incorrect due to the superposition principle, and thus color moiré phenomena may occur. Therefore, a condition for preventing the moiré phenomena and the color moiré phenomena may be shown as Equation 3.

$$P_W=mP_{sub}(t_2+nL)/(t_1+t_2+nL) \qquad \text{[Equation 3]}$$

This condition is for preventing the moiré phenomena or the color moiré phenomena from occurring due to the plurality of walls 240 and the black matrix 144. Accordingly, it is possible to effectively prevent decreasing of the visibility of the observer or the quality of displayed images.

Figure 3:
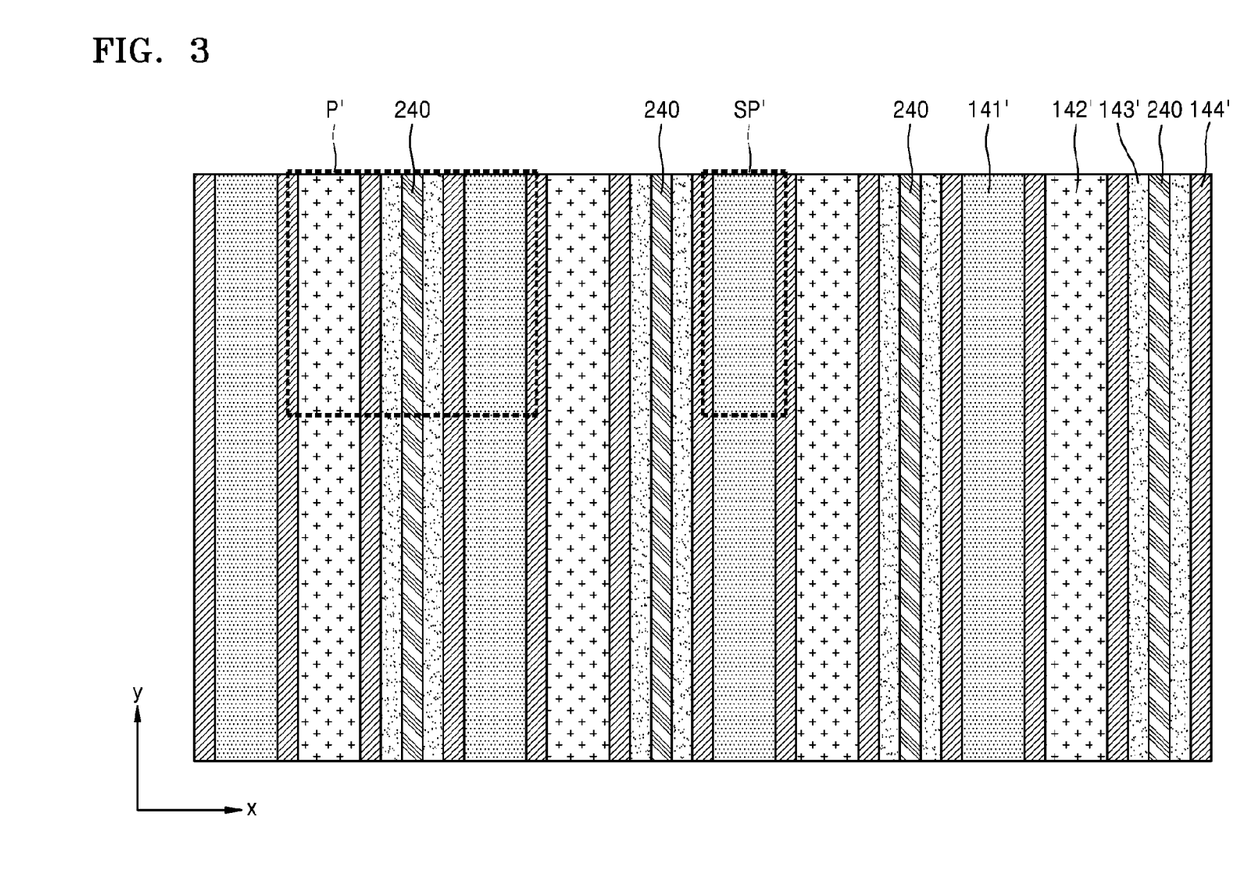
FIG. 3 is a schematic conceptual diagram of a three-dimensional image display device according to a comparative example.

However, even when the above condition is satisfied, the color moiré phenomena may occur in certain cases. That is, as shown in FIG. 3 that is a schematic conceptual diagram of a portion of a three-dimensional image display device according to a comparative example, when the plurality of walls 240 are arranged such that m=3 to satisfy $P_w=mP_{sub'}$, the plurality of walls 240 may be located only on, for example, a projected blue color filter 143' from among a projected red color filter 141', a projected green color filter 142', and the projected blue color filter 143'. In this case, the plurality of walls 240 may partially over only a projected blue sub-pixel from among projected sub-pixels SP' of a projected pixel P', and thus white balance may be incorrect and the color moiré phenomena may occur.

Therefore, the three-dimensional image display device has to satisfy the condition of Equation 3, and also, 'm' cannot be a multiple of 3. In this case, the number 3 is set because it is assumed as an example that a pixel has 3 sub-pixels. When a pixel includes k sub-pixels, m has to be a natural number that is not a multiple of k.

The three-dimensional image display device according to the present embodiment may display high quality images by preventing the moiré phenomena or the color moiré phenomena.

For example, 3 times of a width of the projected sub-pixel SP' in a direction, i.e., the +x direction, may correspond to a width of the projected sub-pixel SP' in another direction, i.e., +y direction. Therefore, a single projected pixel P' may be approximately square-shaped.

Figure 4:
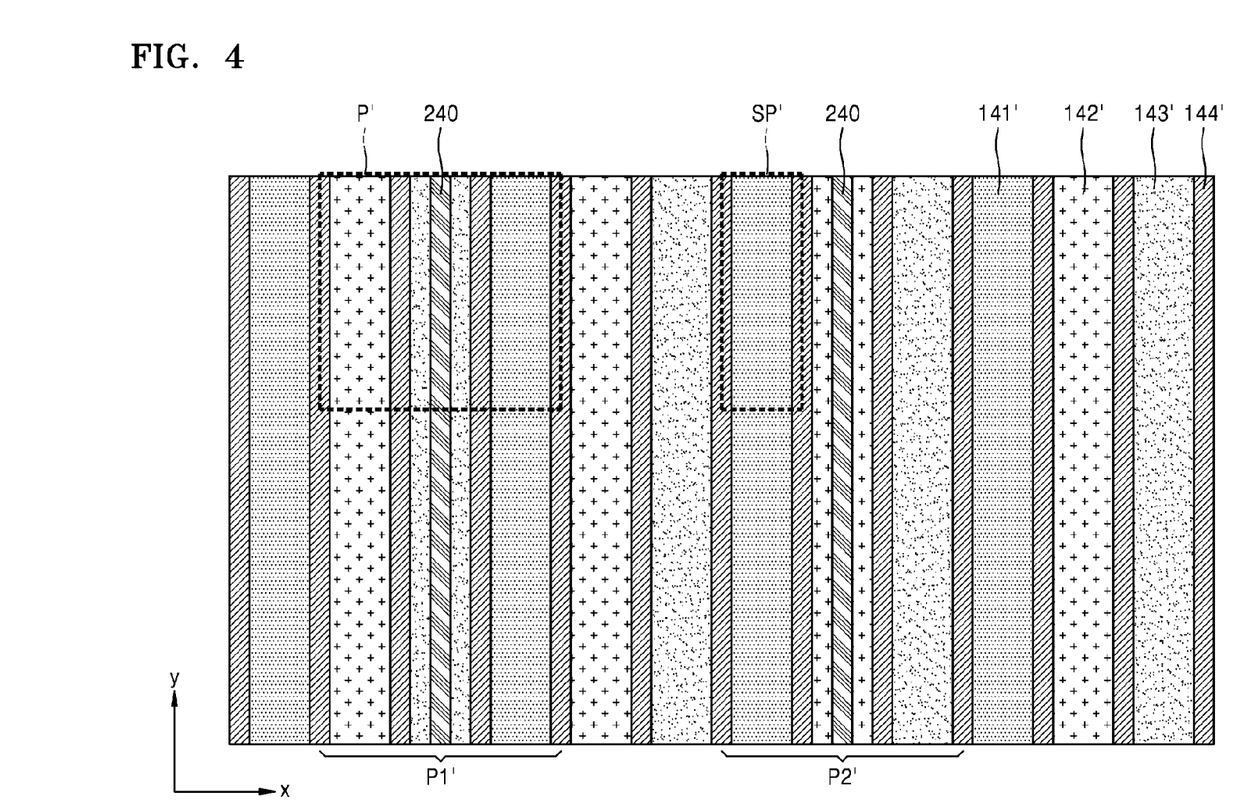
FIG. 4 is a schematic conceptual diagram of a portion of a three-dimensional image display device according to an embodiment of the present invention.

FIG. 4 is a schematic conceptual diagram of a portion of a three-dimensional image display device according to an embodiment of the present invention. As shown in FIG. 4, the condition of Equation 3 is satisfied when m is a natural number that is not a multiple of k. However, the wall 240 appears to be covering the projected blue color filter 143' in a local temporary projected sub-pixel P1' and the wall 240 appears to be covering the projected green color filter 142' in a local temporary projected sub-pixel P2', and thus, the white balance may be locally incorrect and the color moiré phenomena may occur in a thin band form.

Figure 5:
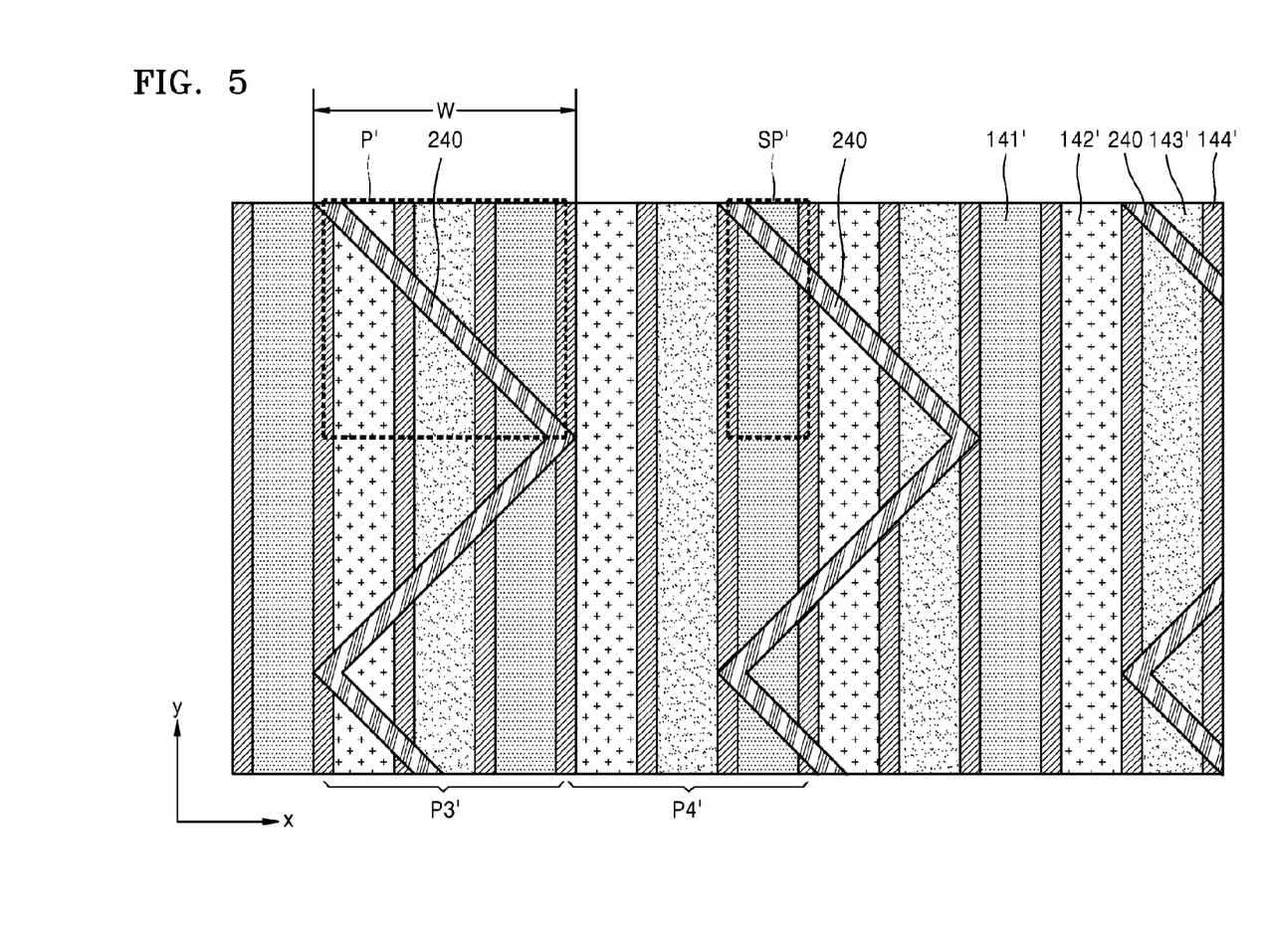
FIG. 5 is a schematic conceptual diagram of a portion of a three-dimensional image display device according to another embodiment of the present invention.

Therefore, in order for the observer to see high quality images by preventing the color moiré phenomena in a thin band form, the plurality of walls 240 may be arranged as in FIG. 5 that is a schematic conceptual diagram of a portion of a three-dimensional image display device according to another embodiment of the present invention. That is, as shown in FIG. 5, each of the plurality of walls 240 may extend in the second direction (+y direction) and change positions in the first direction (+x direction).

In this case, the wall 240 appears to be uniformly covering the projected red color filter 141', the projected green color filter 142', and the projected blue color filter 143' in a local temporary projected sub-pixel P3', but the wall 240 appears to be only covering the projected blue color filter 143' in a local temporary projected sub-pixel P4'. Therefore, the white balance may be locally incorrect, and the color moiré phenomena may occur in a thin belt form.

Figure 6:
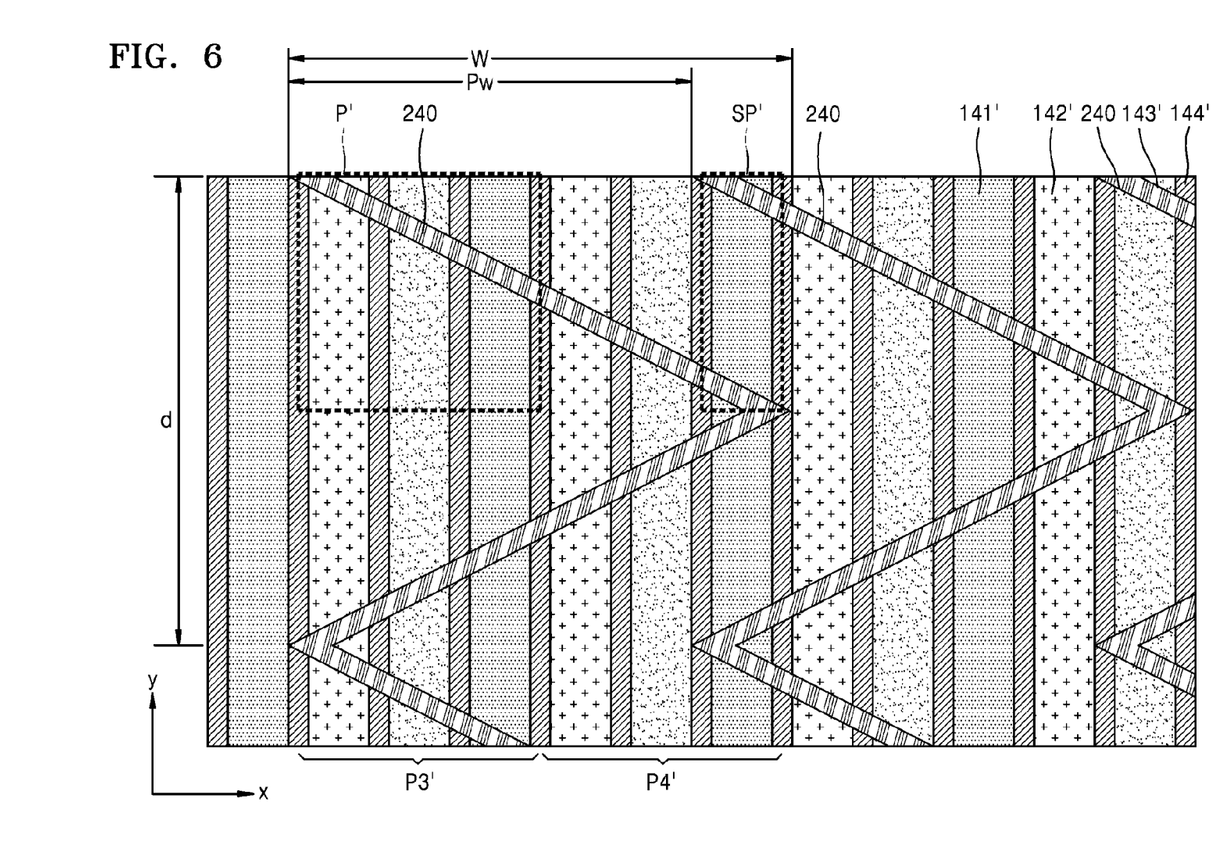
FIG. 6 is a schematic conceptual diagram of a portion of a three-dimensional image display device according to another embodiment of the present invention.

In order for the observer to see high quality images by preventing the color moiré phenomena in a thin belt form, the plurality of walls 240 may be arranged as shown in FIG. 6 that is a schematic conceptual diagram of a portion of a three-dimensional image display device according to another embodiment of the present invention.

That is, as shown in FIG. 6, a width W of each of the plurality of walls 240 that changes positions in the first direction (+x direction) may be equal to or greater than the interval $P_w$, by which the plurality of walls 240 are arranged in the first direction (+x direction), so that there is no projected color filter that is not covered by the wall 240 in between the plurality of walls 240 in the first direction (+x direction). In this case, since the plurality of walls 240 relatively evenly pass through the projected sub-pixels, the color moiré phenomena in a thin belt form may be prevented. FIG. 6 illustrates an example in which a pixel includes 3 sub-pixels, wherein 'W' is approximately equal to $6P_{sub}(t_2+nL)/(t_1+t_2+nL)$ and $P_w$ is equal to the condition that satisfies Equation 3, i.e., $5P_{sub}(t_2+nL)/(t_1+t_2+nL)$.

As shown in FIG. 5 or 6, each of the plurality of walls 240 may extend in the second direction (+y direction) and change positions in the first direction (+x direction). In this case, the width W of each of the plurality of walls 240 that changes positions in the first direction (+x direction) may be equal to or greater than $3P_{sub}$. Then, since the plurality of walls 240 relatively evenly pass through the projected sub-pixels SP' in the projected pixel P', the color moiré phenomena in a thin belt form may be effectively prevented. Since the width W of each of the plurality of walls 240 that changes positions in the first direction (+x direction) may be equal to or greater than $3P_{sub}$, when a pixel includes 3 sub-pixels, when a pixel includes k sub-pixels, the width W may be equal to or greater than $kP_{sub}$, as shown in Equation 4.

$$W \geq kP_{sub}(t_2+nL)/(t_1+t_2+nL) \quad \text{[Equation 4]}$$

When the condition of Equation 4 is satisfied, the observer may see high quality images. Although the observer may see high quality images when the condition of Equation 4 is provided in addition to W being equal to or greater than $P_w$, the present invention is not limited thereto. That is, even when the condition of W being equal to or greater than $P_w$ is not satisfied, when the condition of Equation 4 is satisfied, the observer may recognize three-dimensional images with higher image quality than when using a conventional three-dimensional image display device.

As illustrated, sub-pixels that correspond to light with identical wavelengths may be arranged in the +y direction. Accordingly, when the plurality of walls 240 only pass through some projected sub-pixels in a projected pixel in the +y direction, the color moiré phenomena may occur in a thin belt form. Therefore, a high quality image may be displayed by considering a condition similar to Equation 4 with respect to the +y direction.

Specifically, in each of the plurality of walls 240, an identical pattern is repeated for every distance d in the second direction (+y direction), and the half of the distance d is equal to or less than $kP_{sub}(t_2+nL)/(t_1+t_2+nL)$, as shown in Equation 5.

$$d \leq 2kP_{sub}(t_2+nL)/(t_1+t_2+nL)$$

In this case, since the plurality of walls 240 relatively evenly pass through each of the projected sub-pixels SF in the projected pixel P' in the +y direction, the color moiré phenomena in the thin belt form may be effectively prevented.

When the condition of Equation 4 is not satisfied and only the condition of Equation 5 is satisfied, image quality may decrease by not satisfying the condition of Equation 4. However, in comparison to a three-dimensional image display device in the related art, the observer may see high quality images with significantly reduced moiré phenomena.

Heretofore, although an example in which a pixel includes 3 sub-pixels has been mainly described, the present invention is not limited thereto and may be applied to an example in which a pixel includes k sub-pixels. In this case, k sub-pixels may emit light in different wavelength ranges, and adjacent sub-pixels in the second direction (+y direction) may emit light in an identical wavelength range. Various modification may be possible; for example, when k=4, a pixel may include one red sub-pixel, one blue sub-pixel, and two green sub-pixels.

In the three-dimensional image display device as shown in FIG. 2, the distance L from the outer surface of the barrier panel 200 in the observer's direction (+z direction) to the optimal observing location may be much greater than the distance $t_1$ from the color filter layer 140 of the image panel 100 to the center of the barrier panel 200 or the distance $t_2$ from the center of the barrier panel 200 to the outer surface of the barrier panel 200 in the observer's direction (+z direction). In this case, the average of the center distances $P_{sub}$ between the adjacent sub-pixels in the first direction (+x direction) and the average of the center distances $P_{sub'}$ between the projected sub-pixels adjacent in the first direction (+x direction), which are shown in Equation 1, may be approximately equal to each other.

In this case, Equations 3 to 5 may be converted to Equations 6 to 8, wherein 'k' is the number of sub-pixels included in a pixel, and 'm' is a natural number not equal to 'k.'

$$P_W = mP_{sub} \qquad \text{[Equation 6]}$$

$$W \geq kP_{sub} \qquad \text{[Equation 7]}$$

$$d \leq 2kP_{sub} \qquad \text{[Equation 8]}$$

Equations 3 to 5 may be applied to a three-dimensional image display device that is held and seen by the observer within a short distance, i.e., a mobile three-dimensional image display device, and Equations 6 to 8 may be applied to a three-dimensional image display device that is seen by the observer from far away, i.e., a large screen three-dimensional image display device such as a TV. In addition to, prior to, or independently from Equation 7, the width W of each of the plurality of walls 240 that changes positions in the first direction (+x direction) may be equal to or greater than the interval $P_w$ by which the plurality of walls 240 are arranged in the first direction (+x direction).

Although an example in which the image panel 100 is an LCD panel is described, the present invention is not limited thereto. For example, the present invention may be applied to an example in which the image panel 100 is a different panel such as an organic light-emitting display panel. In this case, a red color filter, a green color filter, and a blue color filter of the color filter layer 140 may correspond to an emission layer of each sub-pixel in the organic light-emitting display panel, i.e., a red emission layer, a green emission layer, and a blue emission layer. This is also applied to a three-dimensional image display device according to the following embodiment.

Figure 7:
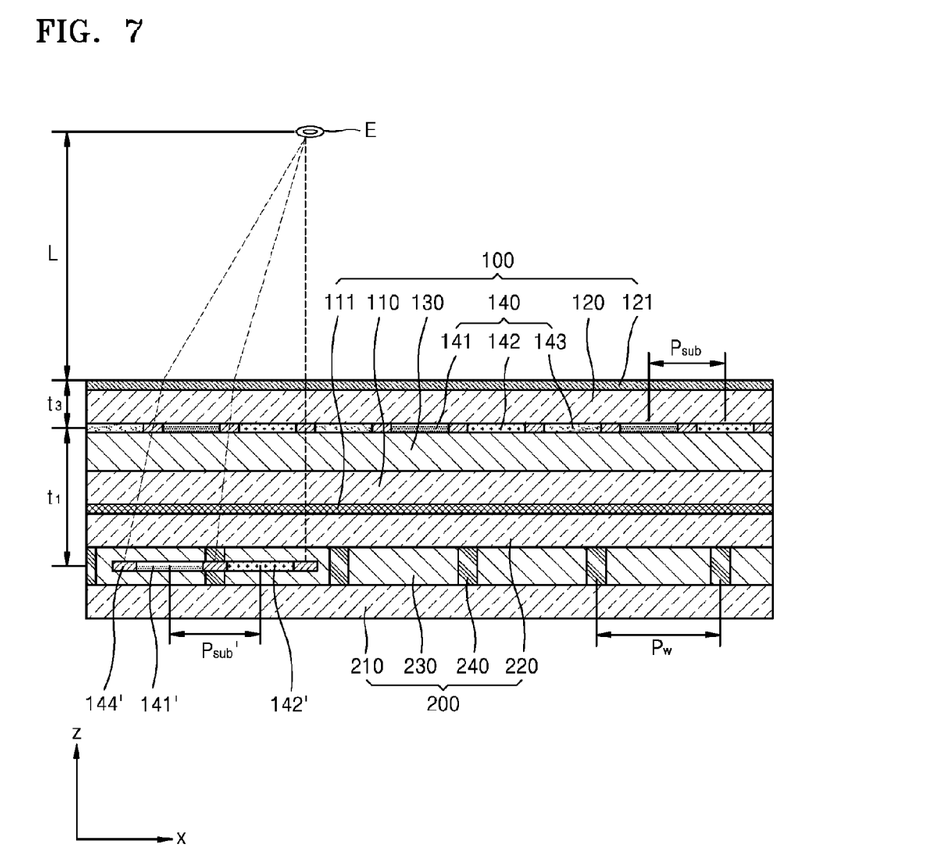
FIG. 7 is a schematic conceptual diagram of a three-dimensional image display device according to another embodiment of the present invention.

FIG. 7 is a schematic conceptual diagram of a three-dimensional image display device according to another embodiment of the present invention.

In the three-dimensional image display device according to the present embodiment, unlike the three-dimensional image display device according to the embodiment described with reference to FIG. 2, the barrier panel 200 is located in the backward direction from the image panel 100. Thus, light may pass through the barrier panel 200, pass through the image panel 100, and then reach the observer. For example, when the image panel 100 is an LCD panel, the barrier panel 200 may be provided between the image panel 100 and a back light.

The image panel 100 may be an image panel displaying color images, for example, an LCD panel as shown in FIG. 7. Since specific features of the image panel 100 and the barrier panel 200 in the backward direction from the image panel 100 are described with reference to the three-dimensional image display devices according to the embodiments above, the description of features will be omitted.

The three-dimensional image display device according to the present embodiment allows the observer to see three-dimensional images, and effectively prevents image quality decrease due to the image panel 100 and the barrier panel 200.

In the three-dimensional image display device according to the present embodiment, an arrangement interval between the plurality of walls 240 of the barrier panel 200 may be appropriately adjusted so that the moiré phenomena due to the black matrix 144 and the plurality of walls 240 are effectively reduced. In order to appropriately adjust the arrangement interval between the plurality of walls 240 of the barrier panel 200 to prevent the moiré phenomena, as described above, the interval between the projected black matrices 144' that are projected into the barrier panel 200 has to be considered instead of the actual interval between the black matrices 144 in the color filter layer 140 of the image panel 100. This is because the moiré phenomena occur when the first objects arranged with the fixed interval $P_1$ are at the same locations as the second objects arranged with the other fixed interval $P_2$ based on the observer.

The light that passed through the color filter layer 140 curves while passing through an outer surface of the image panel 100 in the observer's direction (+z direction) and is indicated on the eye E of the observer. Although a variety of refraction of light may occur because a refraction index of each layer in the image panel 100 or the barrier panel 200 varies, refraction indexes of most materials in the image panel 100 and the barrier panel 200 are around 1.5. Therefore, an average refraction index of the three-dimensional image display device including the image panel 100 and the barrier panel 200 may be considered as 1.5.

When '$t_1$' represents a distance from the color filter layer 140 of the image panel 100 to the center of the barrier panel 200, '$t_3$' represents a distance from the color filter layer 140 of the image panel to the outer surface of the image panel 100 in the observer's direction (+z direction), 'L' represents a distance from the outer surface of the image panel 100 in the observer's direction (+z direction) to an optimal observing location, and 'n' represents an average refraction index of the three-dimensional image display device, the interval between the projected black matrices 144' that are projected into the barrier panel 200, i.e., the center distance $P_{sub'}$ between the adjacent sub-pixels projected into the barrier panel 200 may be shown as Equation 9 according to the Snell's law and geometric structures.

$$P_{sub}' = P_{sub}(t_1 + t_3 + nL)/(t_3 + nL) \qquad \text{[Equation 9]}$$

In order to prevent the moiré phenomena from occurring between the plurality of walls 240 arranged with the average interval $P_w$ and the projected black matrices 144' that are arranged with the average interval $P_{sub'}$, $P_w = mP_{sub'}$ or $P_w = P_{sub'}/m$ has to be satisfied, wherein 'm' is a natural number. Therefore, the average interval $P_w$ of the plurality of walls 240 may be shown as Equation 10.

$$P_W = mP_{sub}(t_1 + t_3 + nL)/(t_3 + nL)$$

or $$P_W = mP_{sub}(t_1 + t_3 + nL)/m(t_3 + nL) \qquad \text{[Equation 10]}$$

However, when $P_w = P_{sub}(t_1 + t_3 + nL)/m(t_3 + nL)$ is satisfied, white balance may be incorrect due to the superposition principle, and thus color moiré phenomena may occur. Therefore, a condition for preventing the moiré phenomena and the color moiré phenomena may be shown as Equation 11.

$$P_W = mP_{sub}(t_1 + t_3 + nL)/(t_3 + nL) \qquad \text{[Equation 11]}$$

This condition is for preventing the moiré phenomena or the color moiré phenomena from occurring due to the plurality of walls 240 and the black matrix 144. Accordingly, it is possible to effectively prevent decreasing of the visibility of the observer or the quality of displayed images.

However, even when the above condition is satisfied, as the three-dimensional image display device according to the embodiment described with reference to FIG. 3, the color moiré phenomena may occur in certain cases. Therefore, the three-dimensional image display device has to satisfy the condition of Equation 11, and also, 'm' should not be a multiple of 3. In this case, the number 3 is set because it is assumed as an example that a pixel has 3 sub-pixels. When a pixel includes k sub-pixels, m has to be a natural number that is not a multiple of k.

The three-dimensional image display device according to the present embodiment may display high quality images by preventing the moiré phenomena or the color moiré phenomena.

For example, 3 times of a width of the projected sub-pixel SP' in a direction, i.e., the +x direction, may correspond to a width of the projected sub-pixel SP' in another direction, i.e., +y direction. Therefore, a single projected pixel P' may be approximately square-shaped.

Features of the three-dimensional image display device according to the embodiment described above with reference to FIG. 4 may also be applied when the barrier panel 200 is located in the backward direction from the image panel 100. That is, as shown in FIG. 4, the wall 240 appears to be covering the projected blue color filter 143' in the local temporary projected sub-pixel P1', and the wall 240 appears to be covering the projected green color filter 142' in a local temporary projected sub-pixel P2', and thus, the white balance may be locally incorrect and the color moiré phenomena may occur in a thin band form. Therefore, in order for the observer to see high quality images by also preventing the color moiré phenomena in a thin band form, each of the plurality of walls 240 may extend in the second direction (+y direction) and change positions in the first direction (+x direction) in the three-dimensional image display device according to the present embodiment, as shown in FIG. 5.

In this case, the wall 240 appears to be uniformly covering the projected red color filter 141', the projected green color filter 142', and the projected blue color filter 143' in the local temporary projected sub-pixel P3', but the wall 240 appears to be only covering the projected blue color filter 143' in the local temporary projected sub-pixel P4'. Therefore, the white balance may be locally incorrect, and the color moiré phenomena may occur in a thin belt form. Thus, in order for the observer to see high quality images by preventing the color moiré phenomena in a thin belt form, the plurality of walls 240 may be arranged as shown in FIG. 6.

That is, in the three-dimensional image display device according to the present embodiment, the width W of each of the plurality of walls 240 that changes positions in the first direction (+x direction) may be equal to or greater than the interval $P_w$ by which the plurality of walls 240 are arranged in the first direction (+x direction). In this case, since the plurality of walls 240 relatively evenly pass through the projected sub-pixels, the color moiré phenomena in a thin belt form may be prevented.

As shown in FIG. 5 or 6, each of the plurality of walls 240 may extend in the second direction (+y direction) and change positions in the first direction (+x direction). In this case, the width W of each of the plurality of walls 240 that changes positions in the first direction (+x direction) may be equal to or greater than $3P_{sub'}$. Then, since the plurality of walls 240 relatively evenly pass through the projected sub-pixels SF in the projected pixel F, the color moiré phenomena in a thin belt form may be effectively prevented. Since the width W of each of the plurality of walls 240 that changes positions in the first direction (+x direction) may be equal to or greater than $3P_{sub'}$ when a pixel includes 3 sub-pixels, when a pixel includes k sub-pixels, the width W may be equal to or greater than $kP_{sub'}$ as shown in Equation 12.

$$W \geq kP_{sub}(t_1+t_3+nL)/(t_3+nL) \quad \text{[Equation 12]}$$

When the condition of Equation 12 is satisfied, the observer may see high quality images. Although the observer may see high quality images when the condition of Equation 12 is provided in addition to W being equal to or greater than $P_w$, the present invention is not limited thereto. That is, even when the condition of W being equal to or greater than $P_w$ is not satisfied, when the condition of Equation 12 is satisfied, the observer may recognize three-dimensional images with higher image quality than when using a conventional three-dimensional image display device.

As shown in FIG. 6, sub-pixels that correspond to light with identical wavelengths may be arranged in the +y direction. Accordingly, when the plurality of walls 240 only pass through some projected sub-pixels in a projected pixel in the +y direction, the color moiré phenomena may occur in a thin belt form. Therefore, a high quality image may be displayed by considering a condition similar to Equation 12 with respect to the +y direction.

Specifically, in each of the plurality of walls 240, an identical pattern is repeated for every distance d in the second direction (+y direction), and the half of the distance d is equal to or less than $kP_{sub}(t_1+t_3+nL)/(t_3+nL)$, as shown in Equation 13.

$$d \leq 2kP_{sub}(t_1+t_3+nL)/(t_3+nL)$$

In this case, since the plurality of walls 240 relatively evenly pass through each of the projected sub-pixels SP' in the projected pixel P' in the +y direction, the color moiré phenomena in the thin belt form may be effectively prevented.

When the condition of Equation 12 is not satisfied and only the condition of Equation 13 is satisfied, image quality may decrease by not satisfying the condition of Equation 12. However, in comparison to a three-dimensional image display device in the related art, the observer may see high quality images with significantly reduced moiré phenomena.

Heretofore, although an example in which a pixel includes 3 sub-pixels has been mainly described, the present invention is not limited thereto and may be applied to an example in which a pixel includes k sub-pixels. In this case, k sub-pixels may emit light in different wavelength ranges, and adjacent sub-pixels in the second direction (+y direction) may emit light in an identical wavelength range. Various modification may be possible; for example, when k=4, a pixel may include one red sub-pixel, one blue sub-pixel, and two green sub-pixels.

In the three-dimensional image display device as shown in FIG. 7, a distance L from an outer surface of the barrier panel 200 in the observer's direction (+z direction) to an optimal observing location may be much greater than the distance $t_1$ from the color filter layer 140 of the image panel 100 to the center of the barrier panel 200 or the distance $t_3$ from the color filter layer 140 of the image panel 100 to the outer surface of the image panel 100 in the observer's direction (+z direction). In this case, the average of the center distances $P_{sub}$ between the adjacent sub-pixels in the first direction (+x direction) and the average of the center distances $P_{sub'}$ between the projected sub-pixels adjacent in the first direction (+x direction), which are shown in Equation 9, may be approximately equal to each other.

In this case, the conditions of Equations 11 to 13 may be converted to conditions of Equations 14 to 16, wherein 'k' represents the number of sub-pixels included in a pixel, and 'm' is a natural number not equal to 'k.'

$$P_W = mP_{sub} \quad \text{[Equation 14]}$$

$$W \geq kP_{sub} \quad \text{[Equation 15]}$$

$$d \leq 2kP_{sub} \quad \text{[Equation 16]}$$

The conditions of Equations 11 to 13 may be applied to a three-dimensional image display device that is held and seen by the observer within a short distance, i.e., a mobile three-dimensional image display device, and the conditions of Equations 14 to 16 may be applied to a three-dimensional image display device that is seen by the observer from far away, i.e., a large screen three-dimensional image display device such as a TV. In addition to, prior to, or independently from the condition of Equation 15, the width W of each of the plurality of walls 240 that changes positions in the first direction (+x direction) may be equal to or greater than the interval $P_w$ by which the plurality of walls 240 are arranged in the first direction (+x direction).

While the present invention has been described with reference to exemplary embodiments illustrated in the drawings, it will be understood by one of ordinary skill in the art that various changes in form and details may be made therein without departing from the spirit and scope as defined by the following claims.

A three-dimensional image display device may provide improved visibility by preventing moiré phenomena.

What is claimed is:

1. A three-dimensional image display apparatus comprising:
   an image panel comprising pixels repeatedly arranged, each of the pixels comprising k sub-pixels in a first direction, wherein k is a natural number and $P_{sub}$ is an average of center distances between adjacent sub-pixels in the first direction; and
   a barrier panel arranged in a forward direction or a backward direction from the image panel,
   wherein the barrier panel comprises:
   a first substrate and a second substrate facing each other;
   a liquid crystal layer interposed between the first substrate and the second substrate;
   a first electrode layer between the first substrate and the liquid crystal layer, and a second electrode layer between the second substrate and the liquid crystal layer; and
   a plurality of walls between the first substrate and the second substrate, extending in a second direction that crosses the first direction, and arranged with an interval $P_w$ therebetween in the first direction,
   wherein at least one of the first electrode layer and the second electrode layer comprises a plurality of stripe electrodes, and the barrier panel is configured to have a transmitting area and a non-transmitting area according to electric signals applied to the first and second electrode layers, and
   when m is a natural number that is not a multiple of k, $P_w = mP_{sub}$.

2. The three-dimensional image display apparatus of claim 1, wherein k=3.

3. The three-dimensional image display apparatus of claim 1, wherein each of the k sub-pixels emits light in a different wavelength range, and adjacent sub-pixels in the second direction emit light in an identical wavelength range.

4. A three-dimensional image display apparatus comprising:
   an image panel comprising pixels repeatedly arranged, each of the pixels comprising k sub-pixels in a first direction, wherein k is a natural number and $P_{sub}$ is an average of center distances between adjacent sub-pixels in the first direction; and
   a barrier panel arranged in a forward direction or a backward direction from the image panel,
   wherein the barrier panel comprises:
   a first substrate and a second substrate facing each other; and
   a plurality of walls between the first substrate and the second substrate, extending in a second direction that crosses the first direction, and arranged with an interval $P_w$ therebetween in the first direction,
   wherein when m is a natural number that is not a multiple of k, $P_w = mP_{sub}$, and
   each of the plurality of walls extends in the second direction and a position thereof changes in the first direction.

5. The three-dimensional image display apparatus of claim 4, wherein a width W of each of the plurality of walls is equal to or greater than $P_w$.

6. The three-dimensional image display apparatus of claim 4, wherein a width W of each of the plurality of walls of which the position changes in the first direction is be equal to or greater than $kP_{sub}$.

7. The three-dimensional image display apparatus of claim 4, wherein, in each of the plurality of walls, an identical pattern is repeated in the second direction for every distance d, and the distance d is equal to or less than $2kP_{sub}$.

8. A three-dimensional image display apparatus comprising:
   an image panel comprising pixels repeatedly arranged, each of the pixels comprising k sub-pixels in a first direction, wherein k is a natural number and $P_{sub}$ is an average of center distances between adjacent sub-pixels in the first direction; and
   a barrier panel arranged in a forward direction from the image panel,
   wherein the barrier panel comprises:
   a first substrate and a second substrate facing each other; and
   a plurality of walls located between the first substrate and the second substrate, extending in a second direction that crosses the first direction, and arranged with an interval $P_w$ therebetween in the first direction,
   wherein when $t_1$ is a distance from a color filter layer or an emission layer of the image panel to a center of the barrier panel, $t_2$ is a distance from the center of the barrier panel to an outer surface of the barrier panel in the forward direction, L is a distance from the outer surface of the barrier panel to an optimal observing location in the forward direction from the barrier panel, n is an average refraction index of the three-dimensional image display apparatus, and m is a natural number that is not a multiple of k, $P_w = mP_{sub}(t_2+nL)/(t_1+t_2+nL)$.

9. The three-dimensional image display apparatus of claim 8, wherein each of the plurality of walls extends in the second direction and a position thereof changes in the first direction.

10. The three-dimensional image display apparatus of claim 9, wherein a width W of each of the plurality of walls of which the position changes in the first direction is be equal to or greater than $kP_{sub}(t_2+nL)/(t_1+t_2+nL)$.

11. The three-dimensional image display apparatus of claim 9, wherein, in each of the plurality of walls, an identical pattern is repeated in the second direction for every distance d, and the distance d is equal to or less than $2kP_{sub}(t_2+nL)/(t_1+t_2+nL)$.

12. The three-dimensional image display apparatus of claim 9, wherein a width W of each of the plurality of walls is equal to or greater than $P_w$.

13. The three-dimensional image display apparatus of claim 8, wherein the average refraction index n of the three-dimensional image display apparatus is equal to 1.5.

14. The three-dimensional image display apparatus of claim 8, wherein each of the k sub-pixels emits light in a different wavelength range, and adjacent sub-pixels in the second direction emit light in an identical wavelength range.

15. A three-dimensional image display apparatus comprising:
an image panel comprising pixels repeatedly arranged, each of the pixels comprising k sub-pixels in a first direction, wherein k is a natural number and $P_{sub}$ is an average of center distances between adjacent sub-pixels in the first direction; and
a barrier panel arranged in a backward direction from the image panel,
wherein the barrier panel comprises:
a first substrate and a second substrate facing each other; and
a plurality of walls between the first substrate and the second substrate, extending in a second direction that crosses the first direction, and arranged with an interval $P_w$ therebetween in the first direction, wherein when $t_1$ is a distance from a color filter layer of the image panel to a center of the barrier panel, $t_3$ is a distance from the color filter layer of the image panel to an outer surface of the image panel in a forward direction, L is a distance from the outer surface of the image panel to an optimal observing location in the forward direction from the image panel, n is an average refraction index of the three-dimensional image display apparatus, and m is a natural number that is not a multiple of k, $P_w=mP_{sub}(t_1+t_3+nL)/(t_3+nL)$.

16. The three-dimensional image display apparatus of claim 15, wherein each of the plurality of walls extends in the second direction and a position thereof changes in the first direction.

17. The three-dimensional image display apparatus of claim 16, a width W of each of the plurality of walls of which the position changes in the first direction is be equal to or greater than $kP_{sub}(t_1+t_3+nL)/(t_3+nL)$.

18. The three-dimensional image display apparatus of claim 16, wherein, in each of the plurality of walls, an identical pattern is repeated in the second direction for every distance d, and the distance d is equal to or less than $2kP_{sub}(t_1+t_3+nL)/(t_3+nL)$.

19. The three-dimensional image display apparatus of claim 16, wherein a width W of each of the plurality of walls is equal to or greater than $P_w$.

20. The three-dimensional image display apparatus of claim 15, wherein the average refraction index n of the three-dimensional image display apparatus is equal to 1.5.

* * * * *